Sept. 14, 1943.  J. A. BATY ET AL  2,329,322
MAKING OF MICROPOROUS PRODUCTS
Filed Oct. 22, 1938
*INCORPORATING THE SOFT FRIABLE HYDROUS SILICIC ACID GEL IN SOLID RUBBER TOGETHER WITH VULCANIZING INGREDIENTS*
*SHAPING THE MASS*
*CURING THE MASS TO A RIGID OR SEMI-RIGID MICROPOROUS STATE UNDER NON-EVAPORATIVE CONDITIONS*
INVENTORS
JOSEPH A. BATY
ALBERT W. MEYER
BY Gourley + Budlong
ATTORNEYS Patented Sept. 14, 1943

2,329,322

UNITED STATES PATENT OFFICE 2,329,322

MAKING OF MICROPOROUS PRODUCTS

Joseph A. Baty, Rochelle Park, and Albert W. Meyer, Nutley, N. J., assignors, by mesne assignments, to United States Rubber Company, New York, N. Y., a corporation of New Jersey Application October 22, 1938, Serial No. 236,459

10 Claims. (Cl. 260—722)

This invention relates to an improvement in the making of microporous products from heat-hardenable plastic compositions, and is more particularly concerned with the manufacture of separators for use in electric storage batteries, electrolytic cells, filter diaphragms, porous cups and the like.

Whereas the invention may be applied to any heat-hardenable plastic including the reactive phenolic resins and urea resins and the like, it relates specially to the treatment of solid dry rubbers such as crude rubber and reclaimed rubber, since they possess properties especially satisfactory for making microporous battery plate separators with which the present invention and following description is more particularly concerned.

According to the invention the dry solid rubber is first broken down according to the usual practice in rubber compounding, on a mill, or in a mixer or masticator, and then a specially prepared highly hydrous silicic acid gel is uniformly worked into the solid mass, together with vulcanizing ingredients. The mass is then shaped, and vulcanized under non-evaporative conditions. The highly hydrous silicic acid gels employed result from the partial dehydration of freshly precipitated gelatinous silicic acid gels. They possess friability and the capability of undergoing extensive shrinkage upon subsequent dehydration, and, because they consist predominantly of water, they have a very large bulk relative to the weight of silica contained therein. For example, in a friable hydrous silicic acid gel containing 22% of silica by weight, one cubic centimeter of silica is associated with about nine cubic centimeters of water, whereas in a porous completely dehydrated vitreous silica gel, such as employed in the prior art, having its capillaries thereafter filled with water, one cubic centimeter of silica is associated with only from two to four cubic centimeters of water. The high microporosity and low electrical resistivity of the separators depend to a large degree upon the proportion of water-filled voids which it is possible to provide in the cured separator, or upon the corresponding volume of air-filled voids of the dried separator. Hence it is clear that the present invention provides a method of securing very high microporosity and correspondingly low electrical resistivity with the presence of a minimum amount of silica.

The drawing illustrates the general scheme of treatment.

During the milling into the rubber of the granular friable hydrous material, as well as during the subseqeunt calendering operations, the material becomes further very finely subdivided and more intimately distributed throughout the rubber mass. No water is required to be added to the mix other than that predeterminately existing in the preformed hydrous material. Other ingredients, such as anti-oxidants, cotton flocks, wood flour, sulphite pulp, and softeners, may be added in addition to the usual vulcanizing ingredients including accelerator and sulphur sufficient to convert the rubber on cure to hard vulcanized rubber.

While hydrous silicic acid gels having certain specified characteristics are employed in the preferred embodiment of the invention, other highly hydrous oxides having like characteristics of friability and the capacity to shrink up-on drying may likewise be employed, for example, hydrous alumina gels, hydrous titania gels, hydrous chromic oxide gels, etc.

For the preparation of the friable silicic acid gels employed in the invention, gelatinous precipitates containing, for example, 5% solids and 95% water, and prepared by methods well known to the chemist, such as by mixing together dilute solutions of sodium silicate and sulfuric acid, are partially dehydrated by any convenient method, such as by pressing and/or drying on drum-driers or trays. Care is taken that the dehydration is not carried beyond the point desired, since after the gelatinous stage has been passed the dehydration and the attendant shrinkage are irreversible, so that the bulky hydrous gels employed in the invention cannot be produced by re-hydration of gels which have been dehydrated beyond the desired point. The change from the slippery semi-fluid gelatinous state into a friable free-flowing particulate state occurs at an $SiO_2$ content of about 15%. When the dehydration of such gels is continued to completion, it is known that shrinkage and loss of water proceed continuously until a dry $SiO_2$ content of about 55 to 70% is reached, after which the dehydration continues with practically no further shrinkage, the gel particles at the same time changing from a friable condition to a hard vitreous state. The gels employed in the present invention are those corresponding to the freshly precipitated and partially dehydrated gels havings a silica content of from about 15 to about 40%, being soft, friable, materials capable of being milled readily into dry rubber, and of undergoing extensive shrinkage upon drying. In order to take the fullest advantage of their great volume change upon drying, the hydrous gels are preferably selected with as high a water content as is compatible with ease of screening the material and milling it into rubber. These requirements are found to be best met by the hydrous gels having a silica content of 20% to 25%. Such gels may readily be prepared so that they are capable of passing through a screen having approximately 30 meshes per linear inch.

From their behavior as herein described it is clear that the soft friable silicic acid gels used in the invention are to be sharply distinguished from the hard vitreous gels resulting from substantially complete dehydration, and from the non-friable semi-liquid silicic acid jelly sometimes commingled with latex and which is so slippery and gelatinous that it cannot be readily milled into dry rubber.

Furthermore the present process, rather than depending upon absorption of water and swelling of a colloid subsequent to the incorporation of said colloid in the rubber, depends upon the incorporation in the dry rubber compound of a very bulky hydrous gel containing in itself sufficient water for the attainment of a high degree of microsporosity in the vulcanized product. The vulcanizates are found to be permeated by innumerable interconnecting microscopic vacuoles or pores having in the aggregate substantially the same volume as that of the water in the gel originally incorporated. The rubber is accordingly found to possess a very high degree of microporosity. Since the micro-structure of the rubber is fixed by vulcanization to the hard rubber state, the effective porosity of the separators for electrical purposes remains the same whether the separators are dried for packing and shipment or whether they are shipped wet, the water in the latter case being subsequently displaced by battery acid after the separators have been assembled into a storage battery.

The proportional of friable silicic acid gel to rubber to be employed may be selected in accordance with the percentage of voids desired in the vulcanized product. Thus, 300 parts of friable silicic acid gel having a silica content of 20% may easily be milled into a rubber composition including rubber 100, sulfur 45, diphenylguanidine 4, and the porosity of the resulting product after vulcanization in water is found to be 55-60%. In contrast to the high porosity thus obtained, the use of dry silica gel in the form of hard vitreous particles, in like amount on the basis of dry $SiO_2$ content, will result in a vulcanized product having a porosity of less than 30%.

The following examples illustrate the production of microporous battery plate separators using the representative preferred mixes A and B, the parts being by weight:

|  | A | B |
|---|---|---|
| Smoked sheet | 100 | 100 |
| Diphenylguanidine | 4 | 4 |
| Sulfur | 45 | 45 |
| Coumarone resin | 10 |  |
| Porous hard rubber separator scrap, ground to pass 100 mesh | 30 |  |
| Wood flour, 100 mesh |  | 30 |
| Silicic acid gel, pressed to 23% silica content | 275 |  |
| Silicic acid gel, pressed to 16% silica content |  | 450 |

The mixes may be calendered on a profile calender of suitable design to provide reinforcing ribs in the sheet material, and the sheet thereafter laid on a fabric liner and wound onto a drum, and the drum immersed in hot water, for vulcanization of the rubber. One such preferred means is described in Keen et al. U. S. P. 2,072,597 wherein a temporary clay mold is applied to the surface of the calendered sheet, prior to vulcanization, as in hot water or saturated steam at the temperature required for vulcanization. After the cure, and following inspection and grinding and cutting to the desired dimensions, the vulcanized articles may if desired be dried in a conventional hot-air drier, or they may be kept wet.

The electrical properties of battery plate separators prepared from compounds A and B are as follows:

|  | A | B |
|---|---|---|
| Average gauge of separator sheet (inch) | .042 | .042 |
| Resistance of 1 square inch, ohms | .050 | .016 |

The measured resistance is of course that of a unit area of the separator immersed in battery acid.

Similar desirable results are obtained by the use of other highly hydrous silicic acid gels having silica contents in the range from 15 to 40%, the best results being obtained with the gels having a silica content of 20-25%.

For purposes of contrast, compounds similar to A and B but using a dried powdered vitreous gel along with 130 parts of water by weight per 100 parts of silica and allowing the same to imbibe water before cure, have a much higher resistance, of the order of 1 to 10 ohms for one square inch.

If desired, additional advantages may be had by treatment of the cured microporous products above described with a solution of caustic, for example, sodium hydroxide or potassium hydroxide followed by washing with water. Such treatment converts substantially all of the silica in the microporous sheet to soluble sodium silicate which is removed by subsequent washing. Treatment for 15 minutes in boiling 10% sodium hydroxide solution is adequate in the case of sheets of average gauge ranging up to .040". Alkali solutions of any convenient strength, for example 2% to 20% weight concentration, may be used, the time required being dependent on the thickness of the article.

The advantages to be obtained by extraction of the silica include (a) increased porosity, and therefore lower electrical resistance in the case of battery plate separators, (b) a battery separator more suitable for use in alkaline batteries such as Edison since the product is free from alkali-solubles which would diffuse into the battery liquid, and (c) increased pore size, and greater permeability to fluids, a characteristic which gives to miroporous diaphragms of this type a greater range of usefulness in filtration processes.

A comparison of physical and chemical properties of untreated and alkali treated microporous sheets from a representative mix fellows. The mix has the same composition as example A, except for the use of 400 parts silicic acid gel of 23% silicia content.

|  | Untreated | Alkali treated |
|---|---|---|
| Ash, percent by weight | 35.7 | 2.5 |
| Porosity (percent voids) | 54.8 | 72.8 |
| Permeability (microdarcies) | 117 | 104,000 |

(A porous medium is said to have a permeability of 1 darcy when a cross sectional area of the medium of 1 sq. cm., 1 cm. thick, sustains a flow of 1 cc. per second for a liquid of 1 centipoise viscosity under a pressure gradient of 1 atmosphere. 1 microdarcy $=10^{-6}$ darcy.)

Other solvents suitable for dissolving the silica may be used; for example an optional method for the removal of silica from this type of microporous sheet is by extraction with hydrofluoric acid.

While the invention has been described with special reference to natural rubber, it can be extended to other heat-hardenable plastics including rubber isomers and artificially-prepared rubbers such as Perbunan (believed to be a co-polymer of butadiene and acrylic nitrile) which may may be vulcanized or set to a rigid or semi-rigid condition.

Since the hydrous silicic acid gel stock results in porous vulcanizates without requiring an intermediate soaking of the unvulcanized stock in water, numerous porous articles of intricate shape may be made by shaping the uncured stock as desired and curing in steam or water or in molds. No rubber solvent is needed to obtain tackiness for adhering seams of the material because the material becomes sufficiently welded during the curing process. Where the stock does not flow well as in the case where molds are used, the rubber used may be softened with the addition of known rubber softeners or plasticizers, among them being mercaptobenzothiazole and its derivatives. The cures are carried out under non-evaporative conditions and where mold cures are used precaution should be taken that steam-tight molds are used or that the molds are placed in an enclosed steam-filled type of press, in order to prevent the escape of water during the cure.

Accordingly by this method articles of various shapes such as porous cups, cylindrical shells, etc., can be made with low cost equipment. The following illustrations indicate the various ways of utilizing the present invention, to wit: (a) a calendered sheet may be applied to a battery plate and cured in steam to serve as a separator and paste retainer or as a separator alone in conjunction with glass wool and a paste retainer; (b) the stock may be extruded from a tuber and cured on a rod; (c) as aforesaid the stock may be shaped as desired and mold-cured in steam or otherwise under non-evaporative conditions.

This case is a continuation-in-part of Serial No. 174,064, filed November 11, 1937.

Having thus described our invention, what we claim and desire to protect by Letters Patent is:

1. The method of making porous compositions of the type described, which comprises producing an inorganic hydrogel, dehydrating said hydrogel sufficiently to convert it into easily granulated crumbly form and insufficiently to prevent it constituting a hydrogel in the presence of water, incorporating said hydrogel throughout a solid unvulcanized rubber mass in a quantity and state of dispersion sufficient to provide a relatively high degree of electrical conductivity when employed as a battery separator, shaping the resulting mixture into the desired shape, and vulcanizing the rubber under non-evaporative conditions.

2. An improvement in the process of making microporous vulcanized hard rubber battery plate separators from solid dry rubbers which comprises incorporating throughout a solid rubber mass a preformed granular soft friable partially dehydrated inorganic oxide hydrogel having a water content of between 60 and 85% by weight, which hydrogel is further characterized in having per se the ability to lose water and shrink on drying, and vulcanizing ingredients, sheeting the mass and curing the rubber mass to a rigid or semi-rigid state under non-evaporative conditions.

3. An improvement in the process of making microporous vulcanized hard rubber battery plate separators from solid dry rubber which comprises incorporating throughout a solid rubber mass a preformed granular soft friable partially dehydrated silica hydrogel having a water content of between 60 and 85% by weight, which hydrogel per se is further characterized in being substantially non-swelling in water and having the capacity to lose water and shrink on drying, and vulcanizing ingredients, sheeting the mass, and curing the rubber mass to a rigid or semi-rigid state under non-evaporative conditions.

4. An improvement in the process of making microporous hard rubber battery plate separators from solid dry rubbers which comprises incorporating throughout a solid rubber mass preformed granular soft friable partially dehydrated silica hydrogel particles having a silica content of from about 15 to about 40% by weight, the remaining percentage being essentially water, said particles per se being further characterized as being substantially non-swelling in water and having the capacity to shrink markedly upon drying, and vulcanizing ingredients, sheeting the mass, and curing the rubber mass to a rigid or semi-rigid state under non-evaporative conditions.

5. An improvement in the process of making microporous hard rubber battery plate separators from solid dry rubbers which comprises incorporating throughout a solid rubber mass preformed granular soft friable partially dehydrated silica hydrogel particles having a silica content of about 20% to about 25% by weight, the remaining percentage being essentially water, said particles per se being further characterized as being substantially non-swelling in water and having the ability to shrink markedly upon drying, and vulcanizing ingredients, sheeting the mass, and curing the rubber mass to a rigid or semi-rigid state under non-evaporative conditions.

6. An improvement in the process of making microporous vulcanized hard rubber articles from solid dry rubbers which comprises incorporating throughout a solid rubber mass a preformed granular soft friable partially dehydrated silica hydrogel having a water content of between 60 and 85% by weight, which hydrogel per se is further characterized in being substantially non-swelling in water and having the capacity to lose water and shrink markedly on drying, and vulcanizing ingredients, sheeting the mass, and curing the rubber mass to a rigid or semi-rigid state under non-evaporating conditions, and increasing the effective pore size by dissolving out the silica.

7. An improvement in the process of making microporous vulcanized hard rubber articles from solid dry rubbers which comprises incorporating throughout a solid rubber mass a preformed granular soft friable partially dehydrated silica hydrogel having a water content of between 60 and 85% by weight, which hydrogel per se is further characterized in being substantially non-swelling in water and having the capacity to lose water and shrink on drying, and vulcanizing ingredients, sheeting the mass, and curing the rubber mass to a rigid or semi-rigid state under non-evaporative conditions, and treating the cured article with alkali and water whereby to dissolve out the silica from the article.

8. An improvement in the process of making microporous hard rubber battery plate separators from solid dry rubbers which comprises incorporating throughout a solid rubber mass preformed granular soft friable partially dehydrated silica hydrogel particles having a silica content of from about 15 to about 40% by weight, the remaining percentage being essentially water, said particles per se being further characterized as being substantially non-swelling in water and having the ability to shrink markedly upon drying, the proportion by weight of said particles being such that the ultimate silica content is less than the vulcanized rubber content in the final separator, and vulcanizing ingredients, sheeting the mass, and curing the rubber mass to a rigid or semi-rigid state under non-evaporative conditions.

9. A solid rubber mix directly adapted, without necessity for additional incorporation of water, for calendering and vulcanization under non-evaporative conditions to form a microporous hard rubber sheet, which mix comprises solid dry unvulcanized rubber having substantially uniformly distributed throughout the mass, preformed soft friable granular partially dehydrated particles of silica hydrogel containing by weight from about 15 to about 40% of silica, the remaining percentage of the particles being essentially water, said hydrogel particles per se having the further characteristic of being substantially non-swelling in water and easily millable into rubber and markedly shrinking on drying, said mix containing in addition vulcanizing ingredients including sulphur sufficient to convert the unvulcanized rubber on cure to hard rubber.

10. The method of making porous compositions which comprises incorporating a partially dehydrated granular friable silica hydrogel having a silica content of about 20 to about 25% by weight, throughout a solid unvulcanized rubber mass in a quantity and state of dispersion sufficient to provide a rubber sheet of a relatively high degree of electrical conductivity when employed as a battery plate separator, shaping the resulting mixture into the desired shape, and vulcanizing the rubber under non-evaporative conditions.

JOSEPH A. BATY.
ALBERT W. MEYER.